United States Patent
Madhusudana et al.

(10) Patent No.: US 9,026,713 B2
(45) Date of Patent: May 5, 2015

(54) EXPANDER FOR LOOP ARCHITECTURES

(71) Applicant: LSI Corporation, Milpitas, CA (US)

(72) Inventors: Naresh Madhusudana, Devarabeesanahalli Bangalore (IN); Raghavendra Channagiri Nagendra, Devarabeesanahalli Bangalore (IN); Giridhar Danayakanakeri, Devarabeesanahalli Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 307 days.

(21) Appl. No.: 13/713,363

(22) Filed: Dec. 13, 2012

(65) Prior Publication Data

US 2014/0173165 A1    Jun. 19, 2014

(51) Int. Cl.
*G06F 13/40* (2006.01)
*G06F 13/42* (2006.01)
*G06F 9/44* (2006.01)
*G06F 13/38* (2006.01)
*G06F 3/06* (2006.01)

(52) U.S. Cl.
CPC ........ *G06F 13/4282* (2013.01); *G06F 13/4022* (2013.01); *G06F 9/4411* (2013.01); *G06F 13/385* (2013.01); *G06F 2213/0028* (2013.01); *G06F 3/0607* (2013.01); *G06F 3/0632* (2013.01); *G06F 3/0689* (2013.01)

(58) Field of Classification Search
CPC .. G06F 9/4411; G06F 13/385; G06F 13/4022
USPC ................................................ 710/8, 10, 104
See application file for complete search history.

(56) References Cited

U.S. PATENT DOCUMENTS

| | | | |
|---|---|---|---|
| 8,051,334 B2 | 11/2011 | Jones et al. | |
| 8,089,902 B1 | 1/2012 | Liao et al. | |
| 8,200,872 B2 * | 6/2012 | Johnson et al. | 710/104 |
| 2009/0007154 A1 * | 1/2009 | Jones | 719/326 |
| 2014/0122761 A1 * | 5/2014 | Nagendra et al. | 710/300 |
| 2014/0317328 A1 * | 10/2014 | Wu | 710/300 |

* cited by examiner

*Primary Examiner* — Glenn A Auve
(74) *Attorney, Agent, or Firm* — Duft Bornsen & Fettig

(57) ABSTRACT

An expander for a device architecture, such as a SAS-compatible expander for a SAS architecture, is configured to follow a set of discovery rules that are applied following detection of a discovery-triggering event, such as system power up or reset. According to one of the discovery rules, the expander waits until after a specified duration following the detected discovery-triggering event before passing on, to any other expanders, any requests to check the status of their discovery processing. Using appropriate values for the specified durations for different expanders, the discovery procedure will be performed without any infinite-messaging problems, even when the device architecture has a loop.

20 Claims, 7 Drawing Sheets

100

STAGE 5
100

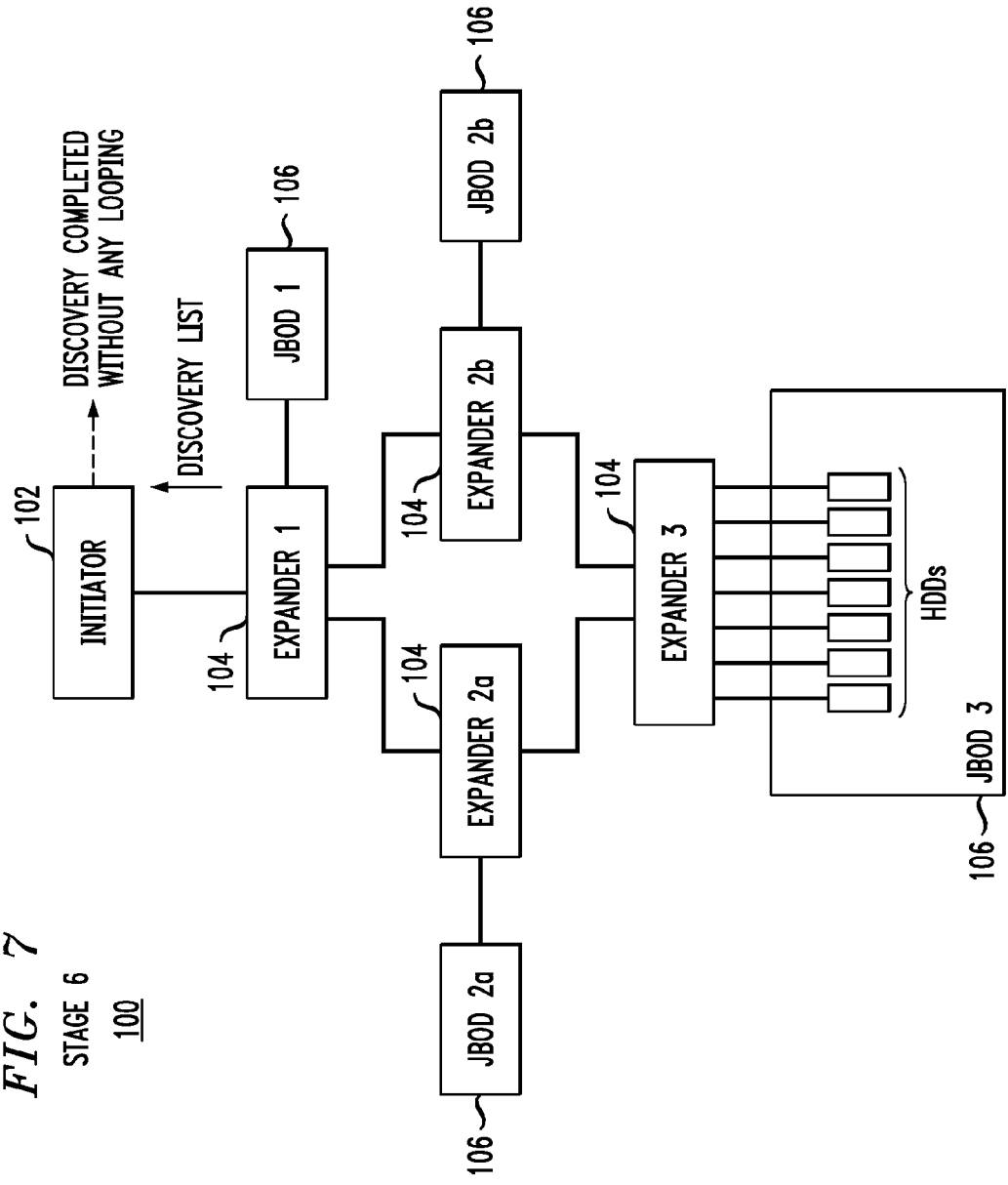

EXPANDER FOR LOOP ARCHITECTURES

BACKGROUND

1. Field

The disclosure relates to device architectures and, more specifically but not exclusively, to expanders for SATA/SAS architectures having loops.

2. Description of the Related Art

This section introduces aspects that may help facilitate a better understanding of embodiments of the invention. Accordingly, the statements of this section are to be read in this light and are not to be understood as admissions about what is prior art or what is not prior art.

The SAS (Serial Attached SCSI (Small Computer System Interface)) protocol specifies a protocol stack that can be used to connect one or more controllers to a number of different target devices such as hard disk drives (HDDs). The SAS protocol specifies the transport layer protocols to transport SCSI commands, SATA (serial advanced technology attachment) commands, and management commands among target devices.

The SAS protocol defines the function of a SAS expander, which is part of the service delivery subsystem and facilitates communication between SAS-compatible devices. Devices connect to an expander across physical links attached to ports on the device and the expander. A "phy" is a transceiver that electrically interfaces with a physical link combined with the portions of the protocol that encode data and manage the reset sequences. A port is created when one or more phys share the same address and attach to a device through one or more physical links.

Multiple SAS expanders can be connected to form a loop in the topology of the resulting SAS architecture. A loop can exist in a SAS topology, for example, when one expander/initiator is indirectly and redundantly connected to the same end device along two parallel paths, each path containing one or more different intermediate expanders. Such a loop may be desirable for a number of reasons, including increased processing throughput and redundancy for failure protection.

Unfortunately, unless handled properly, the existence of such loops in SAS architectures will result in an infinite sequence of discovery messages transmitted between the expanders that form such a loop. According to the SAS protocol, when a discovery-triggering event occurs (e.g., when a SAS architecture is initially powered up or at the end of a reset sequence), each expander automatically performs a discovery procedure of communicating with each device to which it is directly connected to identify all of the different devices to which it is either directly connected or indirectly connected via other expanders. Each expander maintains this device-connection information in an internal device table. When an expander recognizes that it is connected to another expander, the first expander sends a message to the second expander asking the second expander for a list of devices to which it is connected so that the first expander can discover the devices to which it is indirectly connected via the second expander. Note that that second expander will also be similarly querying its own directly connected expanders, and so on. When a SAS architecture has a loop, unless the existence of the loop is somehow taken into account, an infinite sequence of discovery messaging will result as the different expanders that form the loop attempt to complete their individual discovery procedures, thereby preventing the SAS architecture from ever completing its discovery processing.

BRIEF DESCRIPTION OF THE DRAWINGS

Other embodiments of the invention will become more fully apparent from the following detailed description, the appended claims, and the accompanying drawings in which like reference numerals identify similar or identical elements.

FIGS. 2-7 are block diagrams that illustrate the sequence of discovery-related operations implemented by the invention of FIG. 1 following system power up or reset.

DETAILED DESCRIPTION

Figure 1:
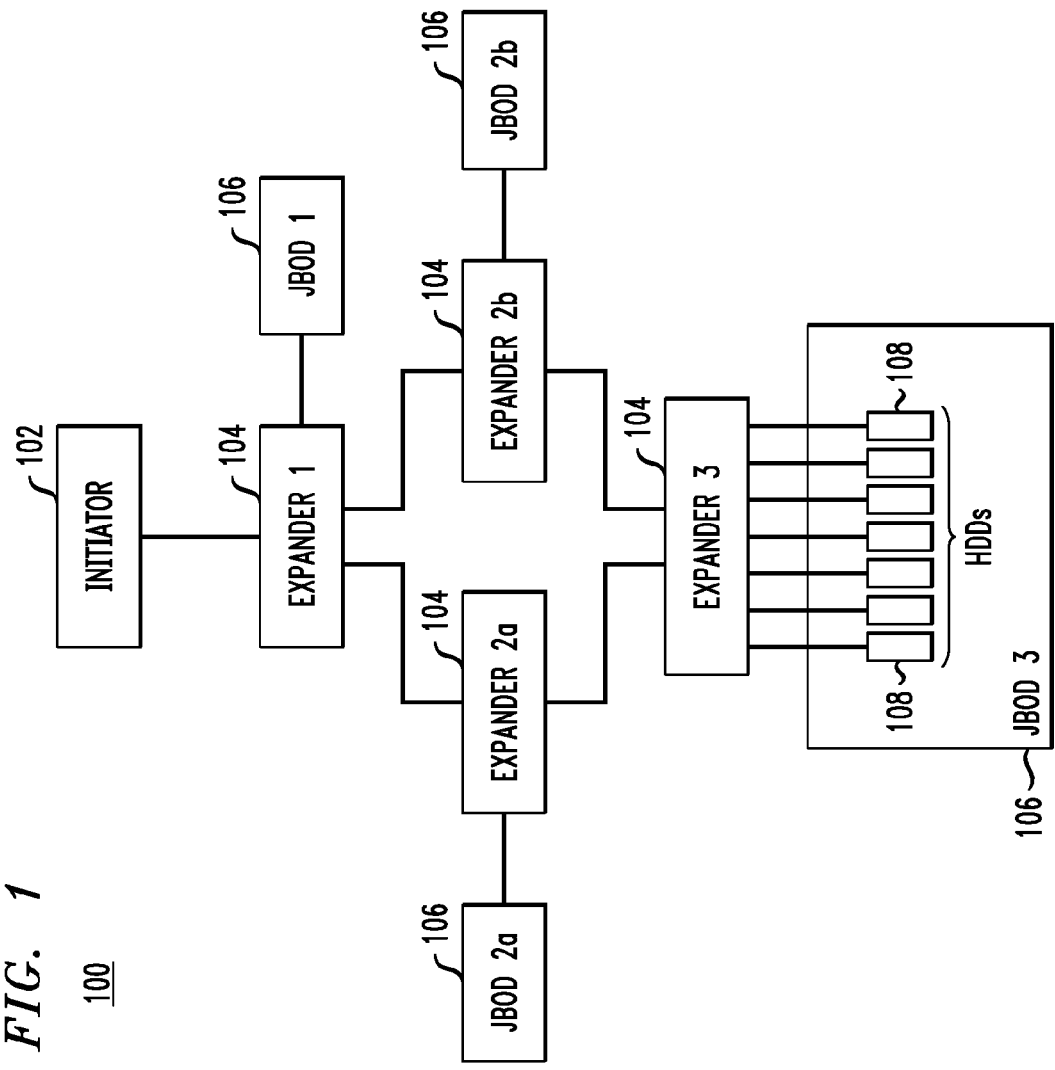
FIG. 1 shows a block diagram of an exemplary SAS architecture having a loop.

FIG. 1 shows a block diagram of an exemplary SAS architecture 100 having a loop. In particular, SAS architecture 100 includes the following SAS-compatible devices: Initiator 102 (a SAS controller), four expanders 104 (i.e., Expanders 1, 2a, 2b, and 3), and four JBODs 106 (i.e., JBODs 1, 2a, 2b, and 3), where JBOD stands for "Just a Bunch Of Devices," and each JBOD 106 represents one or more hard disk drives (HDDs) 108 that are directly connected to a corresponding expander. In FIG. 1, only the seven HDDs 108 of JBOD 3 are explicitly represented in the figure.

In SAS architecture 100, the four expanders 104 are configured in three different hierarchical levels, where Expander 1 is at the first (highest) level, Expanders 2a and 2b are at the second (mid) level, and Expander 3 is at the third (lowest) level in the hierarchy. The loop exists in SAS architecture 100 as a result of Expander 1 being indirectly and redundantly connected to Expander 3 via two parallel paths, one through Expander 2a and the other through Expander 2b.

In SAS architecture 100, each expander 104 is designed, programmed, or otherwise configured to operate under the following four discovery rules:

Rule (1): Upon power up or completion of a reset operation, an expander will automatically identify all of the devices to which it is directly connected, where identifying includes determining the type (e.g., initiator, HDD, expander) of each directly connected device.

Rule (2): After receiving an incoming "check discovery status" request from at least one other (upstream) device to which it is directly connected and after waiting for a specified duration following power up or reset completion, an expander will send an outgoing "check discovery status" request to any (downstream) expander to which it is directly connected, but not to any (upstream) devices from which an incoming "check discovery status" request was previously received.

Rule (3): After receiving at least one incoming "check discovery status" request and after waiting for the specified duration, if there are no other directly connected (downstream) expanders to send an outgoing "check discovery status" request to, then an expander will transmit its device list to each (upstream) device that previously sent it a "check discovery status" request. The device list will omit any other (upstream) devices from which an incoming "check discovery status" request was previously received.

Rule (4): After receiving a device list from each (downstream) expander that was previously sent an outgoing "check discovery status" request, an expander will provide a consolidated device list to each (upstream) device from which an incoming "check discovery status" request was previously received. Here, too, the consolidated device list will omit any other connected devices from which an incoming "check discovery status" request was also previously received.

Omitting appropriate connected devices from device lists is referred to herein as maintaining device lists in "a mutually exclusive manner," which prevents the occurrence of infinite discovery messaging during the discovery procedure in SAS architectures having loops.

FIGS. 2-7 are block diagrams similar to FIG. 1 that illustrate the sequence of discovery-related operations implemented within SAS architecture 100 of FIG. 1 following system power up or reset. This sequence of operations is broken down into six different stages. Prior to initiation of the sequence and based on knowledge of the hierarchical topology of SAS architecture 100, the designer or operator of SAS architecture 100 programs or otherwise configures each expander with an appropriate value for the expander's specified duration parameter. In one implementation, the duration is a configurable parameter stored in the expander's configuration page.

The value for each specified duration is selected to be large enough to ensure that all necessary processing of the corresponding expanders will be completed by that time. For SAS architecture 100, the value selected for duration t1 (for Expanders 2a and 2b) is smaller than the value selected for duration t2 (for Expander 3). In one implementation, the value for the duration t1 is set to the worst-case scenario for Expander 1 to complete discovery of its directly connected devices and transmit outgoing "check discovery status" requests to Expanders 2a and 2b. The value for each other duration can be a corresponding multiple of the duration t1, such that t2=2*t1. These duration values may be determined based on simulation and/or testing of actual implementations of SAS architecture 100.

Figure 2:
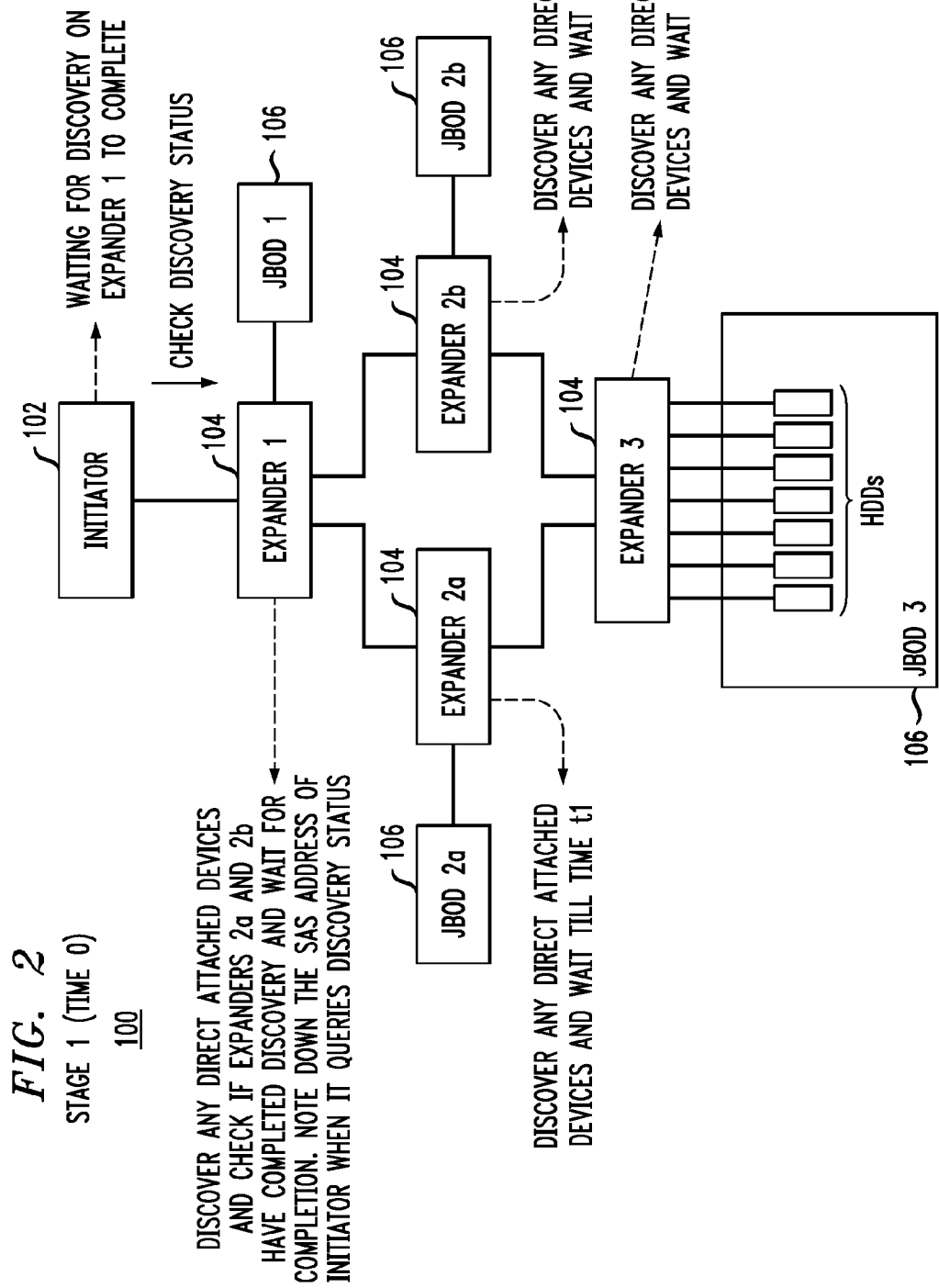

FIG. 2, which illustrates Stage 1, represents processing that occurs between time t0=0 (i.e., corresponding to system power up or the end of reset operations) and time t1. During Stage 1 and pursuant to Discovery Rule (1), each expander automatically identifies all of the devices to which it is directly connected, e.g., using the SAS discovery process, during which the expander determines whether each of its connected PHYs is connected to an end device or to another expander. Thus, Expander 1 communicates with Initiator 102, the HDDs of JBOD 1, and Expanders 2a and 2b to identify those directly connected devices. Similarly, Expander 2a identifies Expanders 1 and 3 and the HDDs of JBOD 2a; Expander 2b identifies Expanders 1 and 3 and the HDDs of JBOD 2b; and Expander 3 identifies Expanders 2a and 2b and the HDDs of JBOD 3. After completing discovery on their directly connected devices, each expander waits until its specified duration has elapsed before proceeding with its discovery processing. Note that Expander 1's specified duration is t0=0.

In addition, during Stage 1, Initiator 102 transmits a "check discovery status" request to Expander 1. This can be performed using the SAS command REPORT GENERAL. In response, Expander 1 responds to Initiator 102 indicating that its discovery is not complete.

Figure 3:
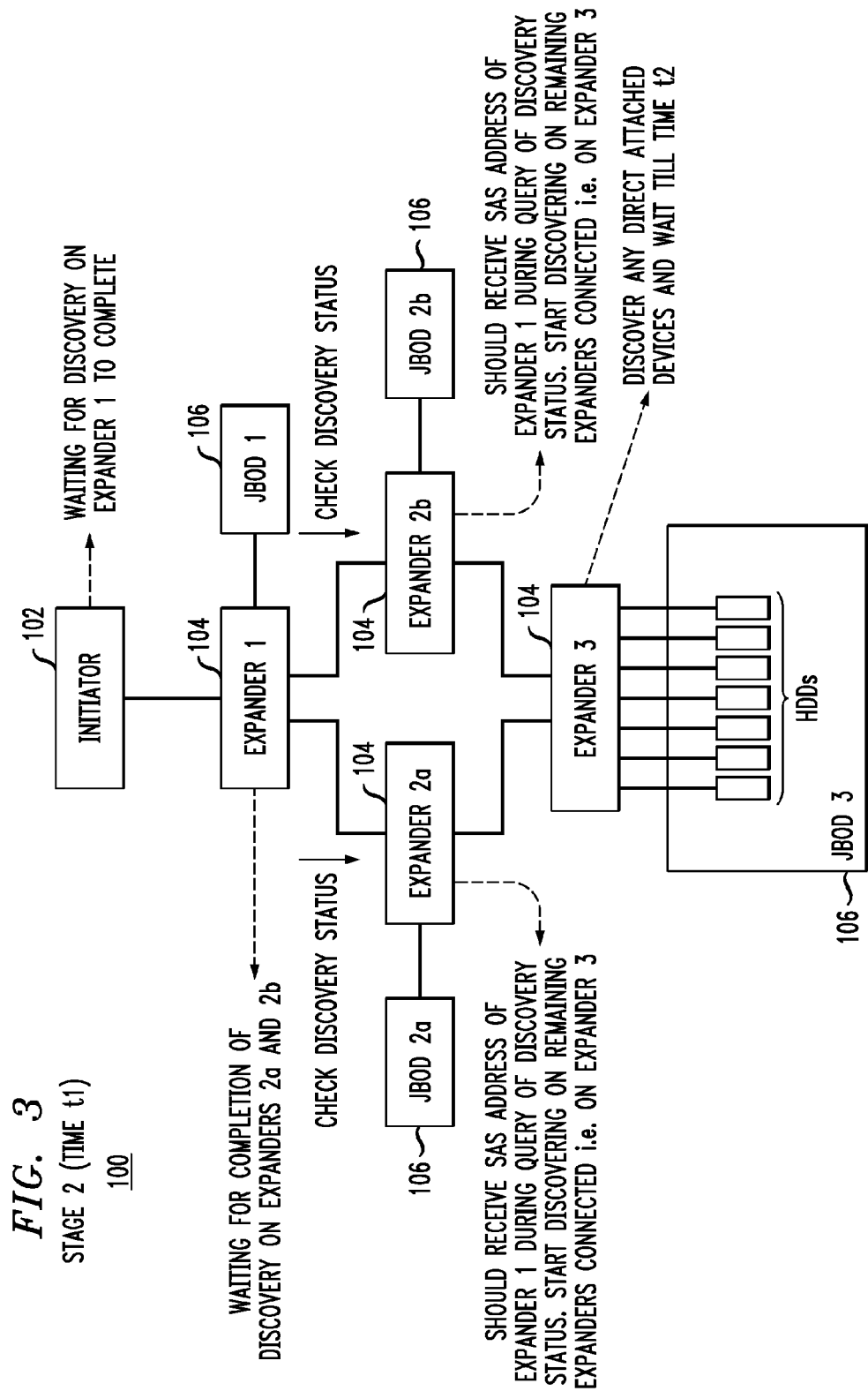

FIG. 3, which illustrates Stage 2, represents processing that occurs between time t1 and time t2. During Stage 2 and pursuant to Discovery Rule (2), Expander 1 sends a "check discovery status" request to each of Expanders 2a and 2b. In response to receiving its corresponding "check discovery status" request from Expander 1, Expander 2a responds to Expander 1 indicating that its discovery is not complete. Similarly, in response to receiving its corresponding "check discovery status" request from Expander 1, Expander 2b also responds to Expander 1 indicating that its discovery is not complete. Note that, because Expander 2a previously received a "check discovery status" request from Expander 1, Expander 2a knows not to send a "check discovery status" request to Expander 1 during Stage 2. Similarly, because Expander 2b previously received a "check discovery status" request from Expander 1, Expander 2b also knows not to send a "check discovery status" request to Expander 1 during Stage 2.

Figure 4:
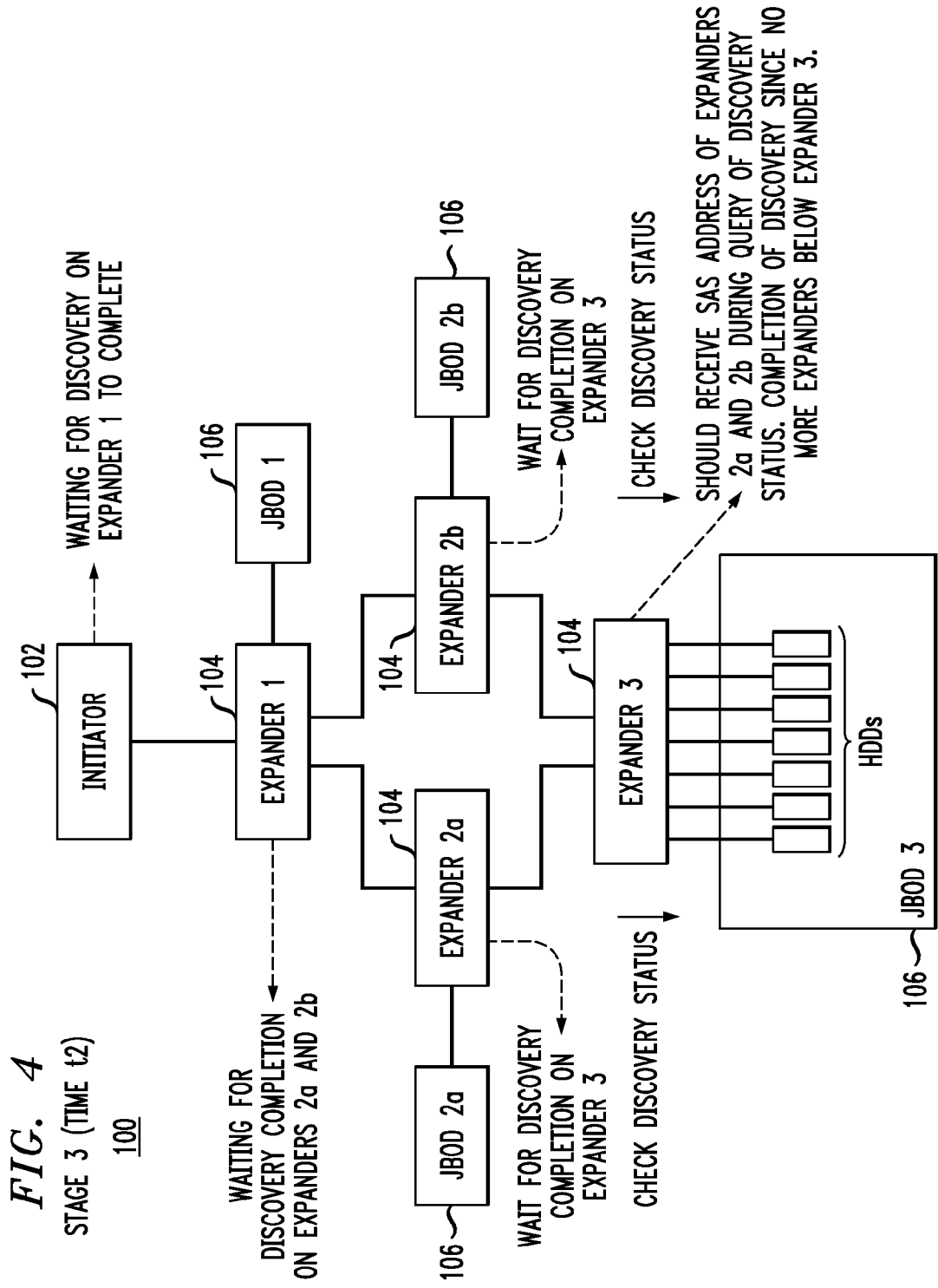

FIG. 4, which illustrates Stage 3, represents processing that occurs between time t2 and time t3. During Stage 3 and pursuant to Discovery Rule (2), Expander 2a sends a "check discovery status" request to Expander 3. Similarly, Expander 2b also sends a "check discovery status" request to Expander 3.

Figure 5:
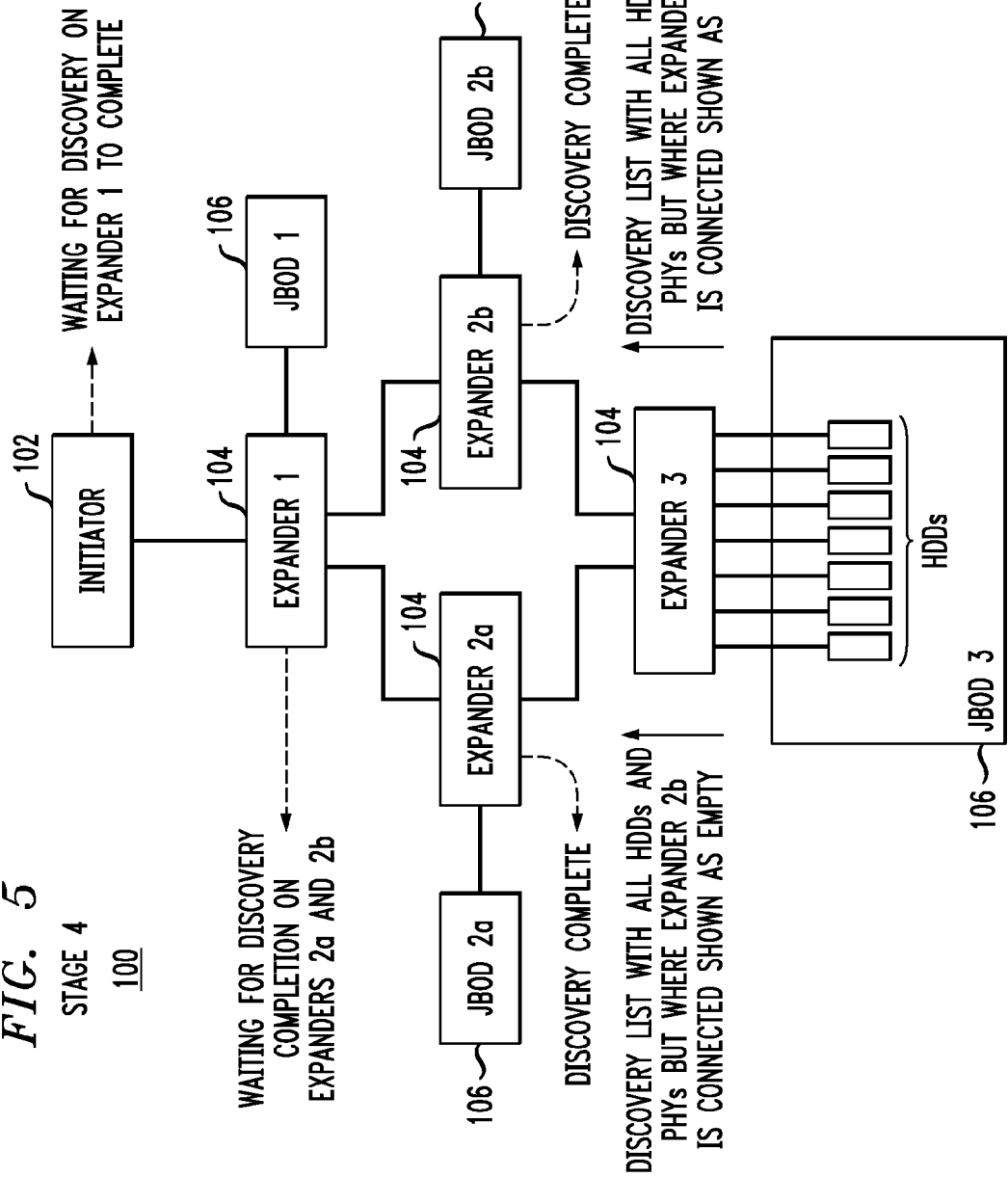

FIG. 5, which illustrates Stage 4, represents processing that occurs immediately after time t3. During Stage 4 and pursuant to Discovery Rule (3), Expander 3 recognizes that it has previously received a "check discovery status" request from all of its directly connected expanders (i.e., Expanders 2a and 2b). As such, Expander 3 determines that there are no other directly connected expanders to send a "check discovery status" request to. As such, during Stage 4, Expander 3 prepares and transmits a first device list of its connected devices to Expander 2a, where the first device list includes the HDDs of JBOD 3, but excludes Expander 2b, because Expander 3 knows that it previously received a "check discovery status" request from Expander 2b. In addition, during Stage 4, Expander 3 prepares and transmits a second device list of its connected devices to Expander 2b, where the second device list includes the HDDs of JBOD 3, but excludes Expander 2a, because Expander 3 knows that it previously received a "check discovery status" request from Expander 2a. In this way, Expander 3 prepares these first and second device lists in a mutually exclusive manner.

Figure 6:
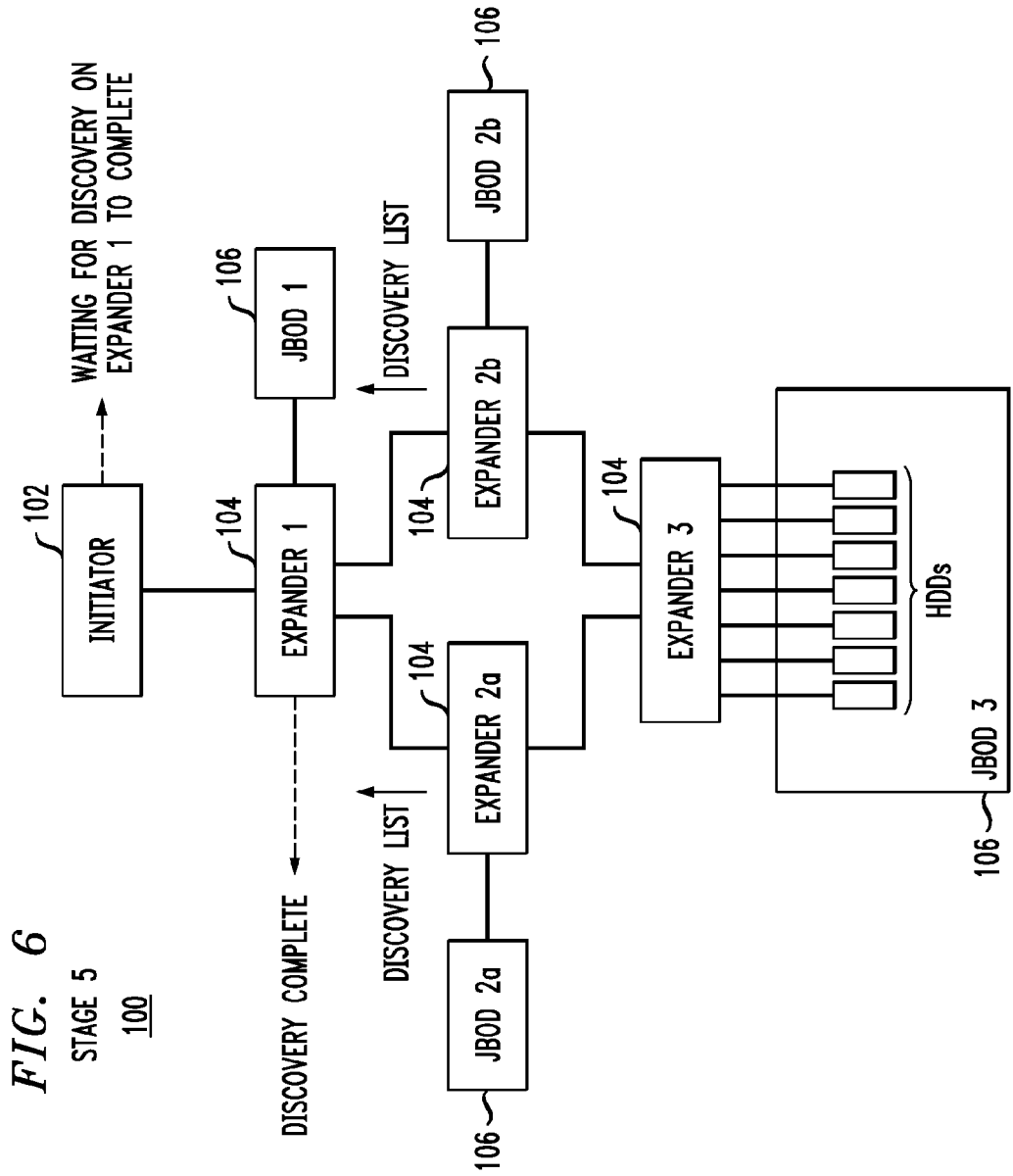

FIG. 6, which illustrates Stage 5, represents processing that occurs immediately after the processing of Stage 4. During Stage 5, Expander 2a recognizes that it has received a device list from Expander 3, the only expander to which Expander 2a previously transmitted a "check discovery status" request. As such, pursuant to Discovery Rule (4), Expander 2a adds the devices in the first device list that it received from Expander 3 to its own device list and transmits the resulting consolidated device list to Expander 1. Similarly, during Stage 5, Expander 2b recognizes that it has received a device list from Expander 3, the only expander to which Expander 2b previously transmitted a "check discovery status" request. As such, pursuant to Discovery Rule (4), Expander 2b adds the devices in the first device list that it received from Expander 3 to its own device list and transmits the resulting consolidated device list to Expander 1.

FIG. 7, which illustrates Stage 6, represents processing that occurs immediately after the processing of Stage 5. During Stage 6, Expander 1 recognizes that it has received device lists from Expander 2a and Expander 2b, i.e., the only expanders to which Expander 1 previously transmitted "check discovery status" requests. As such, pursuant to Discovery Rule (4), Expander 1 adds the devices in the device lists that it received from Expanders 2a and 2b to its own device list and transmits the resulting consolidated device list to Initiator 102.

By the end of Stage 6, Initiator 102 will have received, via the consolidated device list from Expander 1, information identifying every other device in SAS architecture 100 as well as every available, non-looping path to those other devices. For example, for each HDD in JBOD 3, Initiator 102 will know that it can reach that HDD via a first path that includes Expanders 1, 2a, and 3 as well as via a second path that includes Expanders 1, 2b, and 3. Initiator 102 stores this information in its own internal device table, which it can then use to communicate with any of the devices in SAS architecture 100 via any of the available paths. Note that, as a result of the mutually exclusive manner in which device lists are generated during the discovery procedure, Initiator 102 will have available paths from Expander 1 to Expander 3 via either Expander 2a or Expander 2b, but Initiator 102 will have any path available between Expander 2a and Expander 2b via either Expander 1 or Expander 3.

Because each expander in SAS architecture 100 is designed, programmed, or otherwise configured to follow Discovery Rules (1)-(4), no expander is required to have any a priori knowledge of where it exists in the hierarchy of that architecture. Each expander merely reacts locally, initially to the occurrence of a power up/reset condition, and subsequently to the receipt of one or more "check discovery status" requests, by following the appropriate discovery rules. Note that, during the discovery procedure, each expander acquires knowledge of its directly connected upstream expanders (i.e., those expanders from which incoming "check discovery status" requests were received) as well as its directly connected downstream expanders (i.e., those expanders to which outgoing "check discovery status" requests were transmitted).

Although the discovery procedure has been described in the context of the particular topology of SAS architecture 100 of FIG. 1 having a single loop formed by Expanders 1, 2a, 3, and 2b, the discovery procedure can be implemented in the context of other topologies including topologies that do not have any loops as well as topologies having more than one loop. Expanders that follow Discovery Rules (1)-(4) can be deployed in any suitable SAS architecture, and the resulting discovery procedure will be implemented without any loop-related infinite messaging. Note the discovery procedure can be implemented in SAS architectures that, in addition to or instead of having one or more non-integrated JBODs that rely on external expanders (as in SAS architecture 100), have one or more integrated JBODs, each of which is configured with one or more internal expanders.

Although the discovery procedure has been described in the context of SAS architecture 100 having only one controller and SAS hard disk drives as the only SAS target devices, the discovery procedure can be implemented in the context of other SAS architectures having more than one controller (without requiring any zoning) and/or having one or more other suitable types of SAS target devices in addition to or instead of SAS HDDs, such as SATA HDDs.

Although the discovery procedure has described in the context of a SAS architecture having SAS-compatible devices, the discovery procedure can be implemented in SAS architectures having SATA-compatible devices.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Digital information can be transmitted over virtually any channel. Transmission applications or media include, but are not limited to, coaxial cable, twisted pair conductors, optical fiber, radio frequency channels, wired or wireless local area networks, digital subscriber line technologies, wireless cellular, Ethernet over any medium such as copper or optical fiber, cable channels such as cable television, and Earth-satellite communications.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An expander for a device architecture having at least one controller and one or more target devices, wherein:
   (1) the expander is configured with a specified duration value;
   (2) the expander is configured to detect occurrence of a discovery-triggering event;
   (3) the expander is configured to receive, from another device in the device architecture, an incoming request to check status of discovery processing; and
   (4) the expander is configured to wait until after the specified duration value has elapsed following the expander's detection of the occurrence of the discovery-triggering event before transmitting, to an other expander in the device architecture, an outgoing request to check the status of the discovery processing, if the expander determines that it has not previously received, from the other expander, an incoming request to check the status of the discovery processing.

2. The expander of claim 1, wherein, following the expander's detection of the occurrence of the discovery-triggering event, the expander automatically identifies all devices to which the expander is directly connected.

3. The expander of claim 2, wherein the expander automatically identifies its directly connected devices immediately after detecting the occurrence of the discovery-triggering event without waiting for any specified non-zero duration value to elapse.

4. The expander of claim 1, wherein, after receiving at least one incoming request to check the status of the discovery processing and after waiting until after the specified duration value has elapsed following the expander's detection of the occurrence of the discovery-triggering event, if there are no other directly connected expanders to which to send an outgoing request to check the status of the discovery processing, then the expander transmits a device list of its connected devices to each connected device that previously sent it an incoming request to check the status of the discovery processing.

5. The expander of claim 4, wherein the expander is configured to omit from the device list any other connected device from which an incoming request to check the status of the discovery processing was previously received.

6. The expander of claim 1, wherein, after receiving a device list from each other expander that was previously sent an outgoing request to check the status of the discovery processing, the expander provides a consolidated device list to each device from which an incoming request to check the status of the discovery processing was previously received.

7. The expander of claim 6, wherein the expander is configured to omit from the consolidated device list any other connected device from which an incoming request to check the status of the discovery processing was previously received.

8. The expander of claim 1, wherein the expander is a SAS-compatible expander and the device architecture is a SAS architecture.

9. The expander of claim 1, wherein the specified duration value is programmable.

10. The expander of claim 1, wherein the device architecture has a loop formed by a number of expanders.

11. The expander of claim 1, wherein:
    during a first stage of the discovery processing, the controller transmits, to a highest-level expander in the device architecture, a request to check the status of the discovery processing; and
    during a final stage of the discovery processing, the highest-level expander transmits, to the controller, a consolidated device list identifying all available paths to other devices in the device architecture.

12. The expander of claim 11, wherein:
    the device architecture has at least one loop; and
    the available paths do not include any loops.

13. The expander of claim 1, wherein:
    following the expander's detection of the occurrence of the discovery-triggering event, the expander automatically identifies all devices to which the expander is directly connected;
    the expander automatically identifies its directly connected devices immediately after detecting the occurrence of the discovery-triggering event without waiting for any specified non-zero duration value to elapse;
    after receiving at least one incoming request to check the status of the discovery processing and after waiting until after the specified duration value has elapsed following the expander's detection of the occurrence of the discovery-triggering event, if there are no other directly connected expanders to which to send an outgoing request to check the status of the discovery processing, then the expander transmits a device list of its connected devices to each connected device that previously sent it an incoming request to check the status of the discovery processing;
    the expander is configured to omit from the device list any other connected device from which an incoming request to check the status of the discovery processing was previously received;
    after receiving a device list from each other expander that was previously sent an outgoing request to check the status of the discovery processing, the expander provides a consolidated device list to each device from which an incoming request to check the status of the discovery processing was previously received;
    the expander is configured to omit from the consolidated device list any other connected device from which an incoming request to check the status of the discovery processing was previously received;
    the expander is a SAS-compatible expander and the device architecture is a SAS architecture;
    the specified duration value is programmable;
    the device architecture has a loop formed by a number of expanders;
    during a first stage of the discovery processing, the controller transmits, to a highest-level expander in the device architecture, a request to check the status of the discovery processing;

during a final stage of the discovery processing, the highest-level expander transmits, to the controller, a consolidated device list identifying all available paths to other devices in the device architecture;
the device architecture has at least one loop; and
the available paths do not include any loops.

14. A device architecture comprising the expander of claim 1.

15. The device architecture of claim 14, wherein:
following the expander's detection of the occurrence of the discovery-triggering event, the expander automatically identifies all devices to which the expander is directly connected;
the expander automatically identifies its directly connected devices immediately after detecting the occurrence of the discovery-triggering event without waiting for any specified non-zero duration value to elapse;
after receiving at least one incoming request to check the status of the discovery processing and after waiting until after the specified duration value has elapsed following the expander's detection of the occurrence of the discovery-triggering event, if there are no other directly connected expanders to which to send an outgoing request to check the status of the discovery processing, then the expander transmits a device list of its connected devices to each connected device that previously sent it an incoming request to check the status of the discovery processing;
the expander is configured to omit from the device list any other connected device from which an incoming request to check the status of the discovery processing was previously received;
after receiving a device list from each other expander that was previously sent an outgoing request to check the status of the discovery processing, the expander provides a consolidated device list to each device from which an incoming request to check the status of the discovery processing was previously received;
the expander is configured to omit from the consolidated device list any other connected device from which an incoming request to check the status of the discovery processing was previously received;
the expander is a SAS-compatible expander and the device architecture is a SAS architecture;
the specified duration value is programmable;
the device architecture has a loop formed by a number of expanders;
during a first stage of the discovery processing, the controller transmits, to a highest-level expander in the device architecture, a request to check the status of the discovery processing;
during a final stage of the discovery processing, the highest-level expander transmits, to the controller, a consolidated device list identifying all available paths to other devices in the device architecture;
the device architecture has at least one loop; and
the available paths do not include any loops.

16. The device architecture of claim 14, wherein, following the expander's detection of the occurrence of the discovery-triggering event, the expander automatically identifies all devices to which the expander is directly connected.

17. The device architecture of claim 16, wherein the expander automatically identifies its directly connected devices immediately after detecting the occurrence of the discovery-triggering event without waiting for any specified non-zero duration value to elapse.

18. The device architecture of claim 14, wherein, after receiving at least one incoming request to check the status of the discovery processing and after waiting until after the specified duration value has elapsed following the expander's detection of the occurrence of the discovery-triggering event, if there are no other directly connected expanders to which to send an outgoing request to check the status of the discovery processing, then the expander transmits a device list of its connected devices to each connected device that previously sent it an incoming request to check the status of the discovery processing.

19. The device architecture of claim 18, wherein the expander is configured to omit from the device list any other connected device from which an incoming request to check the status of the discovery processing was previously received.

20. The device architecture of claim 14, wherein, after receiving a device list from each other expander that was previously sent an outgoing request to check the status of the discovery processing, the expander provides a consolidated device list to each device from which an incoming request to check the status of the discovery processing was previously received.

* * * * *